July 13, 1965  D. H. THORBURN  3,194,497
TEMPERATURE CONTROL SYSTEM
Filed Feb. 12, 1962  2 Sheets-Sheet 1

INVENTOR.
David H. Thorburn,
BY
Byron, Hume, Groen & Clement
Attorneys.

INVENTOR.
David H. Thorburn,
BY
Byron, Hume, Groen & Clement
Attorneys.

United States Patent Office 3,194,497
Patented July 13, 1965

3,194,497
TEMPERATURE CONTROL SYSTEM
David H. Thorburn, Oak Park, Ill., assignor to Powers Regulator Company, Skokie, Ill., a corporation of Illinois
Filed Feb. 12, 1962, Ser. No. 172,458
8 Claims. (Cl. 236—1)

This invention relates in general to a temperature control system and more particularly to a system for regulating the temperature of a fluid medium. It deals specifically with a system for maintaining a predetermined air temperature in an enclosure.

It is an object of this invention to provide a new and improved control system for regulating the temperature of a fluid medium.

It is another object to provide a control system for regulating air temperature in an enclosure.

It is still another object to provide a control system for maintaining a predetermined optimum air temperature in an enclosure.

It is yet another object to provide a control system which can readily be adapted for selectively regulating air temperature in an enclosure by heating the air or by cooling the air.

It is a further object to provide a control system including a new and improved valve assembly for regulating the flow of a heating or cooling fluid as a function of the temperature of a fluid medium.

It is still a further object to provide a valve assembly of the aforedescribed character which is selectively reversible to regulate and provide modulation of the flow of either a heating or a cooling fluid.

The above and other objects are realized in accordance with the present invention by providing a control system for regulating the temperature of a fluid medium within an enclosure. Briefly, the invention contemplates a pressure operated valve assembly which is characteristically controlled by a temperature sensitive pressure system wherein the valve assembly regulates, alternatively, the flow of a cooling or a heating fluid into temperature modifying relationship with an enclosed fluid medium. The temperature sensitive pressure system is preset to maintain a pre-established valve relationship when the temperature of the enclosed fluid medium is at a predetermined optimum value. If the temperature of the enclosed fluid medium varies from the predetermined value, the temperature responsive pressure system modulates the flow of the heating or cooling fluid through the office of the pressure operated valve assembly and, as a result, modifies the temperature of the fluid medium within the enclosure.

In one aspect of the present invention, the control system is set up to regulate either the heating of an enclosed fluid medium in the winter, for example, or the cooling of such a fluid medium during the summer. The control system acts in a single capacity only, either as a heating control system or as a cooling control system. In another aspect of this invention, however, the control system is effective to alternatively and selectively regulate the heating or cooling of an enclosed fluid medium, as a matter of choice. In either case, the temperature of the fluid medium within the enclosure tends to be maintained at a predetermined optimum value.

The invention, both as to its organization and method of operation, taken with further objects and advantages thereof, will best be understood by reference to the following description taken in connection with the accompanying drawings, in which.

Figure 1:
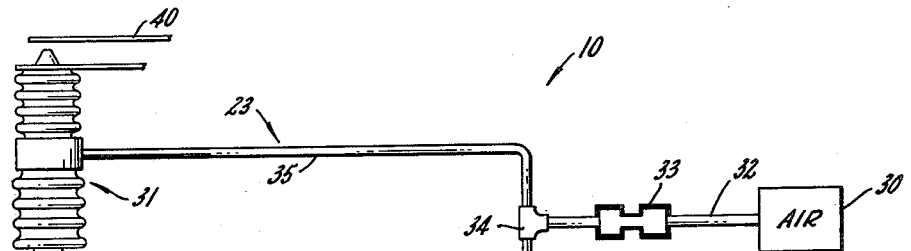
FIGURE 1 is a schematic view of a temperature control system embodying the features of one form of the present invention.

Referring now to the drawings and particularly to FIGURE 1, one form of a temperature control system is shown generally at 10. The system 10 is broadly conventional, incorporating however, certain improvements over the prior art which assure superior operating characteristics. The temperature control system 10 is effective to regulate the flow of a heating or a cooling fluid into heat transfer relationship with the air circulating in an enclosed room, for example, to maintain a predetermined optimum air temperature in the room. The system 10 can be set up to operate either as a heating control system for operation during the winter, for example, or a cooling control system for use during the summer. In this respect, however, the system 10, is single actions. For purposes of illustration it is set up as a heating system, for example, and must be structurally modified to operate as a cooling system.

Figure 2:
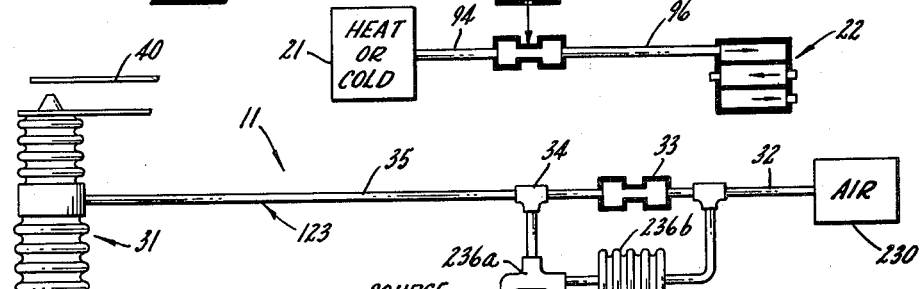
FIGURE 2 is a schematic view of a temperatrue control system embodying the features of another form of the present invention.

As opposed to the temperature control system 10, referring now to FIGURE 2, a double acting temperature control system is illustrated generally at 11. The double acting system 11, in contrast to the system 10, is set up to be selectively utilized as a heating control system or a cooling control system for maintaining a predetermined optimum air temperature. In this light, the system need not be structurally modified to function alternatively in a heating or a cooling capacity.

Referring once more to FIGURE 1, the temperature control system 10 includes a pressure responsive valve assembly, seen generally at 20, which regulates the flow of a heating fluid from a source 21 thereof to a heat transfer unit 22 within a room (not shown), for example, as a function of the air temperature within the room sensed by a temperature sensitive pressure system, seen generally at 23. The heat transfer unit 22 regulates the room air temperature as a function of temperature variations from a predetermined optimum temperature.

Keeping in mind that the system 10 is described here in terms of a heating control system, the temperature sensing pressure system senses the temperature of the room air and signals the pressure responsive valve assembly 20 to regulate the flow of a heating fluid to the heat transfer unit 22 as a function of the sensed air temperature. The heating fluid is preferably hot water but it might be another similar fluid medium. If the air temperature is below a predetermined optimum temperature, which we will arbitrarily say is 72° F., a maximum amount of heating fluid is permitted to flow to the heat transfer unit 22 by the pressure responsive valve assembly 20.

As a result, the room air is heated. As the temperature of the room air reaches and rises above 72° F., the temperature sensitive pressure system 23 signals the valve assembly 20 to modify the flow of heating fluid to the heat transfer unit 22 and consequently modify the heating of the room. As a result, a colder environment surrounding the room (in the winter for example) tends to bring the temperature of the room air back to the predetermined optimum temperature of 72° F. Although this invention is described in terms of heating air in an enclosed room, however, it should be kept in mind that this use is illustrative only and the invention might be utilized to regulate the temperature in various other fluid mediums.

The temperature sensitive pressure system 23 includes a source of air pressure 30 which is in direct fluid communication with the atmosphere through an air supply line 32 containing a conventional restrictor valve 33, a T-joint 34, an air service line 35, and a temperature sensing pressure signal assembly 31 of generally well known construction. The service line 35 is, in turn, connected in direct communication with the pressure responsive valve assembly 20.

A predetermined constant air pressure is maintained at the source 30. For present purposes, this pressure is preferably about 18 p.s.i., although it might be varied considerably. The conventional restrictor valve 33 is provided to restrict the flow of air from the source 30, through the service line 35 and the temperature sensing pressure signal assembly 31, to the atmosphere. The temperature sensing pressure signal assembly 31 is, in turn, effective to restrict the escape of air from the service line 35 to the atmosphere as a function of the temperature of the room air which the system 10 is set up to regulate.

The signal assembly 31 provides a minimum restriction of the air escaping from the service line 35 when the room air temperature is at the predetermined optimum temperature of 72° F. or lower. This produces a minimum constant pressure signal in the service line 35 and the valve assembly 20 is responsive to this minimum pressure signal to effect a maximum flow of heating fluid to the heat transfer unit 22. Consequently, the room air is heated and brought up to the predetermined optimum temperature. This minimum constant service line pressure might be any predetermined constant pressure in the lower range, although it has been found in practice that a pressure in the neighborhood of 2 p.s.i. is preferable.

As the temperature of the room air rises above 72° F. the signal assembly 31 is effective to further restrict the escape of air from the service line 35 and consequently build up air pressure in the service line and in the valve assembly 20. Under the influence of an increased pressure signal the valve assembly 20 decreases the flow of heating fluid to the heat transfer unit 22 and the room air is allowed to cool to its predetermined optimum temperature of 72° F. through natural loss of heat to its cooler surroundings.

Figures 3, 4:
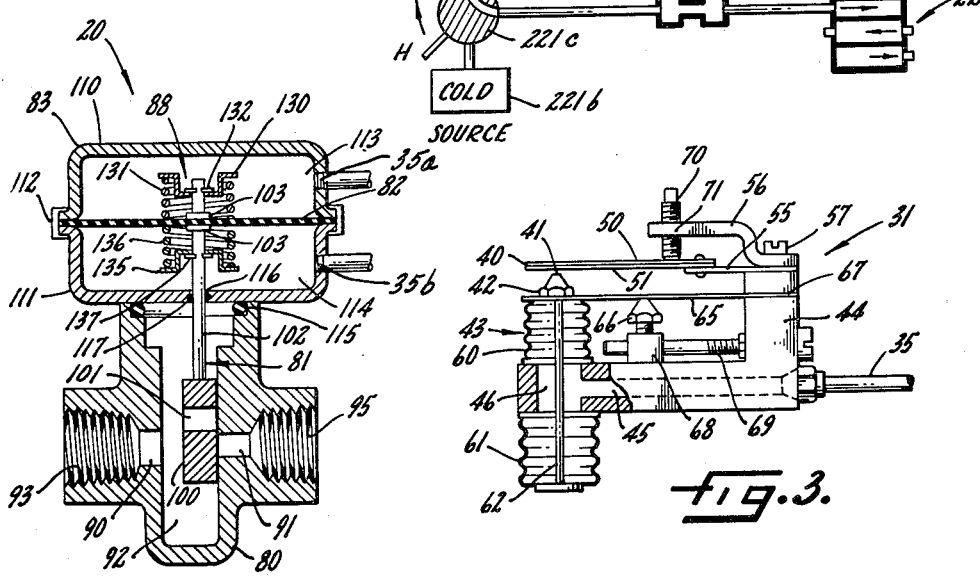
FIGURE 3 is a side elevational view, partially in section, of a temperature sensing pressure signal assembly incorporated in the temperature control system shown in FIGURES 1 and 2.
FIGURE 4 is a sectional view of a pressure operated valve assembly incorporated in the temperature control system shown in FIGURES 1 and 2.

Referring to FIGURE 3, the construction of the temperature sensing pressure signal assembly 31 is illustrated in detail. It regulates the pressure in the service line by restricting the escape of air from the service line 35 as a function of the temperature of the aforedescribed room air. The valve assembly 20 is, in turn, responsive to the pressure in the service line 35 to regulate the flow of heating fluid from its source 21 to the heat transfer unit 22 in a manner generally described above.

The signal assembly 31 includes a bimetal member 40 which is sensitive to the air temperature within the room (not shown). The bimetal member bends in a well known manner under the influence of room air temperature and controls the flow of air out of an aperture 41 in a nozzle 42 mounted on a bellows unit 43 which is in communication with the service line 35 through the body 44 of the signal assembly 31. The body 44 is preferably composed of cast metal and has a longitudinally extending passage 45 within its confines connected to the service line 35 and to a transverse passage 46 in which the bellows unit 43 is mounted.

The bimetallic member 40 is constructed to restrict the aperture 41 as the room air temperature rises above the prescribed optimum temperature of 72° F. This restriction builds up pressure in the service line 35 and consequently in the pressure responsive valve assembly 20. An increase in pressure in the valve assembly 20 effects a modulation of the passage of heating fluid through the heat transfer unit 22 and consequently permits the room air to cool off under the influence of its cooler surroundings. If the room air temperature is at or below the optimum temperature of 72° F., the aperture 41 is not restricted by the bimetallic member 40 and the normal predetermined residual air pressure of 2 p.s.i. is present in the service line 35. At 2 p.s.i., of course, a maximum flow of heating fluid is permitted by the valve assembly 20 and the heat transfer unit 22 tends to increase the temperature of the room air until the predetermined optimum temperature of 72° F. is reached.

The bimetallic member 40 is generally conventional in construction and comprises an upper and a lower metal strip, 50 and 51, respectively, bonded together and having different thermal coefficients of expansion. Consequently, as the room air temperature rises, if the metal strip 50 has a higher thermal coefficient of expansion, the bimetallic member 40 bends downwardly to restrict the aperture 41. The temperature sensing pressure signal assembly 31 is constructed so that the bimetallic member 40 is secured to the body 44 of the signal assembly 31 through a support element 55 clamped between a bracket 56 and the body 44 by a bolt 57. The bimetallic member 40 is preferably riveted to the support element 55, although it might be attached by other means.

It will now be seen that by selecting metallic strips 50 and 51 having predetermined thermal coefficients of expansion so that the bimetallic member 40 will bend at a predetermined rate as room air temperature increases, and positioning the bimetallic member 40 in predetermined relationship with the aperture 41, the escape of air from the aperture 41 will be restricted only when the temperature rises above the predetermined optimum temperature of 72° F. Any increase in temperature over 72° F. subsequently causes a scheduled increased restriction of the aperture 41 and consequently effects a scheduled increase of the pressure within the service line 35. This, in turn, through the valve assembly 20, effects a modulation of the flow of heating fluid to the heat transfer unit 22 according to a prescribed schedule.

The bimetallic member 40 is constructed and arranged, of course, so that a predetermined incremental increase in room air temperature is effective to cause a predetermined incremental increase in pressure in the service line 35. In turn, the incremental increase in pressure within the service line 35 is effective, by virtue of the unique construction of the valve assembly 20, to effect a predetermined incremental decrease in the flow of heating fluid to the heat transfer unit 22.

Utilizing a bimetallic member 40 alone, however, to assure a preset schedule of pressure increases within the service line 35, is somewhat inadequate. This is true because the bimetallic member 40, by virtue of its own unique properties, is extremely sensitive to temperature increases and accordingly it bends considerably for each incremental temperature increase. To compensate for this effect, and assure the maintenance of a prescribed schedule of increasing pressure increments, the bellows unit 43 incorporates a pressure feedback arrangement which effectively spaces the aperture 41 a predetermined distance from the bimetallic member 40 for each incremental temperature increase.

The bellows unit 43 comprises a smaller upper bellows 60 and a relatively larger lower bellows 61 firmly seated in air tight relationship upon the upper and lower ends, respectively, of the vertical transverse passage 46 within the body 44 of the signal assembly 31. The upper end of the bellows 60 and the lower end of the bellows 61 are interconnected by a rod 62, in a well known manner.

Both bellows 60 and bellows 61 tend to expand as the pressure within the bellows unit 43 builds up, of course, but since the lower bellows 61 is larger than the upper bellows 60, it has a greater effect and slowly retracts the aperture 41 from the bimetallic member 40 as the member 40 moves toward the aperture tending to build up pressure within the service line 35. The relationship of the bellows 60 and 61 to each other is, of course, precalculated to establish a predetermined rate of retraction from engagement with the bimetallic member 40 as the member 40 bends downwardly. Consequently, small increases in room air temperature, for example, cause correspondingly small increases in pressure within the service line 35 in accordance with the predetermined schedule.

The sensitivity of the bellows unit 43 to increases in pressure within the service line 35 is controlled by a leaf spring 65 and fulcrum arrangement 66. The leaf spring 65 is rigidly mounted on the body 44 of the signal assembly 31, as at 67, in any well known manner, and rigidly connected at its opposite end to the upper end of the bellows 60 below the nozzle 42. The fulcrum 66 is mounted on a base member 68 which is longitudinally fixed on an adjusting bolt 69 threadably mounted in the body 44.

It will be seen that by turning the adjusting bolt 69, the position of the fulcrum 66 is readily varied along the length of the leaf spring 65. Moving the fulcrum 66 toward the nozzle 42, for example, decreases the sensitivity of the signal assembly 31 since the aperture 41 cannot back away from the bimetallic member 40 as readily as it would if the fulcrum 66 were further from the nozzle 42. Consequently, a greater increase in pressure within the bellows unit 43 is required before the aperture 41 backs away from the bimetallic member 40 and the resulting greater increase in service line 35 pressure creates a larger incremental decrease in the flow of the heating fluid to the heat transfer unit 22 as a result of a predetermined increase in temperature.

To vary the predetermined optimum temperature setting from 72° F., for example, to a higher or a lower temperature, an adjusting screw 70 is threadably mounted in an internally threaded aperture 71 in the bracket 56. The adjusting screw 70 engages the bimetallic member 40 to position it relative to the aperture 41.

It will be obvious, of course, that if a temperature of 60° as opposed to 72° F., is desirable, it is only necessary to subject the bimetallic member 40 to a 60° temperature environment and reposition it with the adjusting screw. In other words, the bimetallic member 40 will normally bend upwardly in an atmosphere of 60° F. By turning the adjusting screw 70, it can readily be forced downwardly again until it just begins to restrict the aperture 41. Any increase in temperature of the environment over the newly predetermined optimum temperature of 60° F. will then cause the bimetallic member 40 to bend downwardly and restrict the aperture 41. Restriction of the aperture 41 in turn causes an increase in service line pressure and an increase in pressure in the valve assembly 20. The flow of fluid from the source of heating fluid 21 to the heat transfer 22 is thus modified by the pressure responsive valve assembly 20 and the room air temperature is allowed to decrease under the influence of its cooler environment to the newly set optimum temperature of 60° F.

To permit fine adjustment of the spacing between the bimetallic member 40 and the aperture 41, the fulcrum 66 is threadably mounted. As will be seen, it can be screwed up and down in the base member 68 and as such it vertically positions the aperture 41. In this manner, the signal assembly 31 is provided with an arrangement for precisely presetting an optimum temperature.

Turning now to the details of construction and operation of the pressure responsive valve assembly 20, the valve assembly is effective to maintain a maximum flow of heating fluid to the heat transfer unit 22 when the pressure in the service line 35 is at a predetermined minimum pressure of 2 p.s.i. or less. Any pressure increase over 2 p.s.i., as effected by an increase in room air temperature, causes the pressure responsive control valve 20 to effect a decrease in the flow of heating fluid and a corresponding drop in the room air temperature under the influence of its colder surroundings, as in the winter, for example.

Referring now to FIGURE 4, the pressure responsive valve assembly 20 is illustrated in detail. The valve assembly 20 includes a valve housing 80 through which a heating fluid flows under the control of a pressure motivated valve slide 81. The valve slide 81 is connected to and pressure motivated by a pressure responsive diaphragm 82 mounted in a diaphragm housing 83 suitably connected in fluid communication with the service line 35, as at 35a. Thus, in operation as a heating control system, the housing 83 would be vented to the atmosphere on the opposite side of diaphragm 82, as at 35b. Of course, when operating as a cooling control system, the service line would be connected to the diaphragm housing 83 at 35b and the housing vented at 35a. The diaphragm 82 is sensitive to the pressure within the service line 35 to effect the movement of the slide valve 81 and control the passage of fluid through the valve housing 80. The valve slide 81 is connected to the diaphragm 82 through a flow modulation sub-assembly 88 which is preset to modulate movement of the slide valve 81 according to a predetermined schedule when the pressure in the diaphragm housing 83 increases or decreases as a function of service line pressure.

The valve housing 80 preferably comprises a metal casting having an inlet port 90 and an outlet port 91 interconnected by valve chamber 92. An internally threaded bore 93 extends outwardly from the inlet port 90 and is threadably connected to a fluid conduit 94 from the source 21 of heating fluid. In turn, an internally threaded bore 95 extends outwardly from the outlet port 91 in the valve housing 80 and is connected through a fluid conduit 96 to the heat transfer unit 22.

It will now be seen that heating fluid will pass from the source 21 to the heat transfer unit 22 through the valve housing 80 when the outlet port 91 is unblocked or partially unblocked by the valve slide 81 which, in turn, is motivated by the pressure in the service line 35; the motivation being modulated by the flow modulation sub-assembly 88, according to a preset schedule. The valve slide 81 is shown in FIGURE 4 in its inoperative, neutral position relative to the outlet port 91. It includes a slide block 100 having a transversely extending passage 101 therethrough. The slide block 100 is mounted on the lower end of a slide rod 102 which extends upwardly into the diaphragm housing 83 and is operatively connected to the diaphragm 82 by lock nuts 103.

The diaphragm housing 83 comprises an inverted upper shell 110 and a lower shell 111 having the diaphragm 82 clamped between them by a clamping ring 112 of well known construction. An upper chamber 113 and a lower chamber 114 are formed by the diaphragm 82 and the upper and lower shells, 110 and 111, respectively. The diaphragm housing 83 is seated on the valve housing 80 (see FIGURE 4) in fluid tight relationship, as maintained by the O-ring 115. The slide rod 102 of the valve slide 81 extends into the diaphragm housing 83 through an aperture 116 in the lower shell 111 of the housing and a fluid tight relationship is maintained therebetween by an O-ring 117.

As has been pointed out, FIGURE 4 illustrates the valve slide 81 and the valve outlet port 91 in their neutral relationship, which is maintained when the pressure in the service line 35 and the chamber 113 is atmospheric. When a gauge pressure of 2 p.s.i. is developed in the service line 35, however, by turning on the air pressure source 30, for example, the valve slide moves downwardly. This downward movement is unrestricted until the flow modulation sub-assembly 88 seats on the lower shell 111 and assumes modulation control of the movement of the diaphragm 82 and consequently of the slide valve 81.

The flow modulation sub-assembly 88 holds the slide valve 81 in its full open position as long as a pressure of 2 p.s.i. in the chamber 113 is not exceeded. When the pressure rises above 2 p.s.i., the initial bias is overcome and the slide valve moves downwardly under the biasing control of the sub-assembly 88. By varying the biasing effect of the sub-assembly 88, of course, the schedule of increase in heating fluid flow for a prescribed pressure increase can readily be adjusted.

The flow modulation sub-assembly 88 includes an upper cup member 130 which is biased away from the diaphragm 82 by a coil spring 131 of predetermined strength and retained on the slide rod 102 by a snap ring 132. The lower cup member 135 is biased away from the diaphragm 82 by a coil spring 136 of predetermined strength and retained on the slide rod 102 by the snap ring 137. By controlling the strength of the coil springs 131 and 136, the movement of the slide valve 81 is also controlled. In other words, the strength of the springs 131 and 136 determines the extent of flow modulation effected as a function of a predetermined increase in service line pressure, for example. As will be evident, however, only the lower spring 136 is effective in the case where the system 10 is utilized in its heating capacity. The upper spring 131 performs the same function when the system 10 is utilized in its cooling capacity.

The pressure responsive valve assembly 20 has, of course, been described in substantial detail. It should be pointed out, however, that its showing is, in part, diagrammatic.

Figure 5:
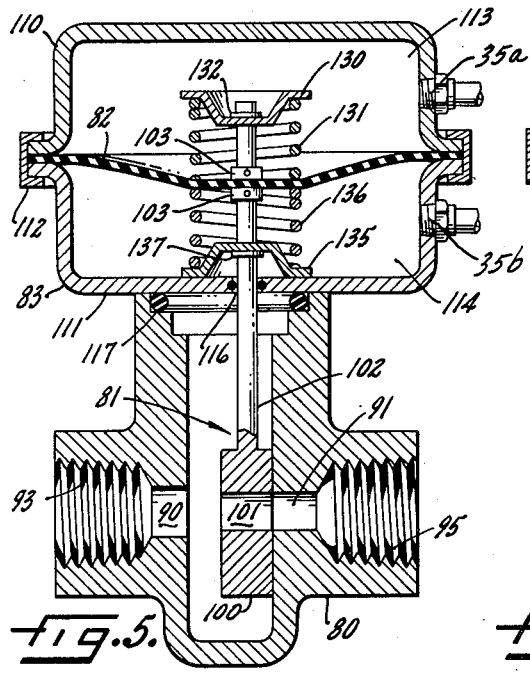
FIGURE 5 is a sectional view of the valve assembly seen in FIGURE 4, showing the valve relationship when the temperature of a sensed fluid medium is at a predetermined optimum value and the system is operating in its heating capacity.
Figure 6:
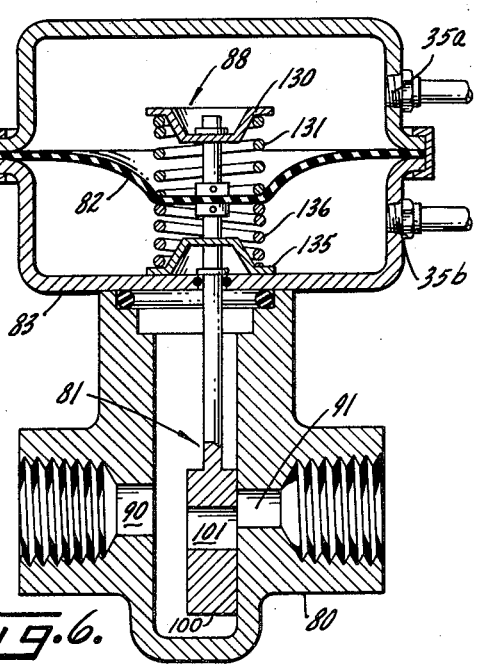
FIGURE 6 is a sectional view similar to FIGURE 5 showing a modified valve relationship when the valve assembly is operating in its heating capacity.

Referring now to FIGURES 5 and 6, the operation of a pressure responsive valve assembly 20 in a temperature control system 10 operating as a heating control system, is illustrated in detail. For example, as seen in FIGURE 5, when the residual air pressure in the service line 35 is in the neightborhood of, but equal to or less than 2 p.s.i., the diaphragm 82 is moved downwardly into the position shown. In this position, the cup member 135 is seated on the lower shell 111 of the diaphragm housing 83. This minimum pressure of 2 p.s.i. in the service line 35, is of course, effected when the temperature sensing pressure signal assembly 31 senses a room air temperature of equal to or less than the prescribed temperature of 72° F. and consequently calls for a maximum flow of heating fluid.

Under these circumstances, the slide valve 81 is in a position where the outlet port 91 of the valve housing 80 is in substantially aligned relationship with the passage 101 through the slide block 100 and consequently a maximum flow of fluid is permitted through the valve block 80. This flow of fluid continues as long as the temperature of the room air remains at or below 72° F.

When the temperature of the room air rises above 72° F., however, the signal assembly 31 causes the pressure within the service line 35 to build up in programmed relationship to the increase in room air temperature. This increased pressure is effective on the diaphragm 82 within the valve assembly 20 and it moves downwardly against the bias of the coil spring 136.

As has been pointed out, the coil spring 136 is of a predetermined strength. This predetermined strength is related to the programmed increase in pressure within the service line 35 and permits the slide valve 81 to move downwardly a predetermined amount for each incremental increase in pressure within the service line 35 as effected by a corresponding increase in room air temperature. As a result, as will be seen in FIGURE 6, the passage 101 in the slide block 100 begins to move out of alignment with the outlet port 91 to modify the flow of heating fluid through the valve block 80.

A higher room air temperature, of course, causes a further buildup of service line 35 pressure by the signal assembly 31. Consequently, the diaphragm 82 moves further downwardly against the bias of the coil spring 136. This in turn moves the slide valve block and eventually tends to close the outlet port 91 since the passage 101 approaches complete misalignment with the outlet port 91 at this point. As a result, the flow of heating fluid approaches zero and the room air is allowed to cool under the influence of its colder outside environment.

The temperature sensing pressure signal assembly 31 is continually sensing the temperature of the room air and continually developing a programmed corresponding air pressure signal in the service line 35. Accordingly, the pressure responsive valve assembly 20 is continually responsive to fluctuations in room air temperature and this response is effective to correspondingly control the passage of heating fluid from the source 21 to the heat transfer unit 22 within the enclosed room.

As has previously been pointed out, the temperature control system 10 embodying one form of this invention might readily be utilized as a cooling control system for use during the summer also. As such, the system 10 provides and regulates a cooling medium to lower the room air temperature when the temperature in the room begins to rise above the predetermined optimum temperature of 72° F. In the case where the system 10 is utilized in its cooling capacity, it is identical in construction and operation to the heating control system defined above with but two significant exceptions.

The first and most obvious exception is that the source 21 of control fluid is a source of cooling fluid which is preferably cold water or the like, for example. Second, the service line 35 of the pressure system 23 is connected to the pressure responsive valve assembly 20 below the diaphragm 82, as at 35b, so as to be in direct communication with the lower chamber 114 of the diaphragm housing 83. In this light, the operation of the pressure responsive valve assembly 20, where the control system 10 is operating in its cooling capacity, is shown in detail in FIGURES 7 and 8.

Figure 7:
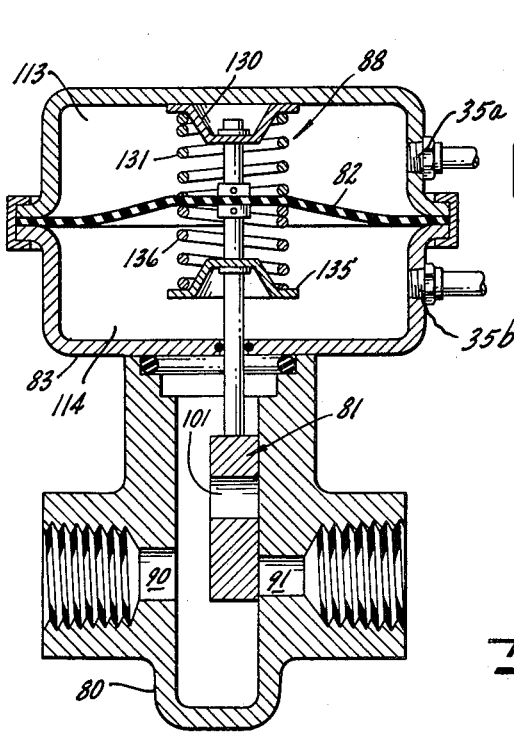
FIGURE 7 is a sectional view of the valve assembly seen in FIGURE 3 showing the valve relationship when the temperature of a sensed fluid medium is at a predetermined optimum value and the system is operating in its cooling capacity.
Figure 8:
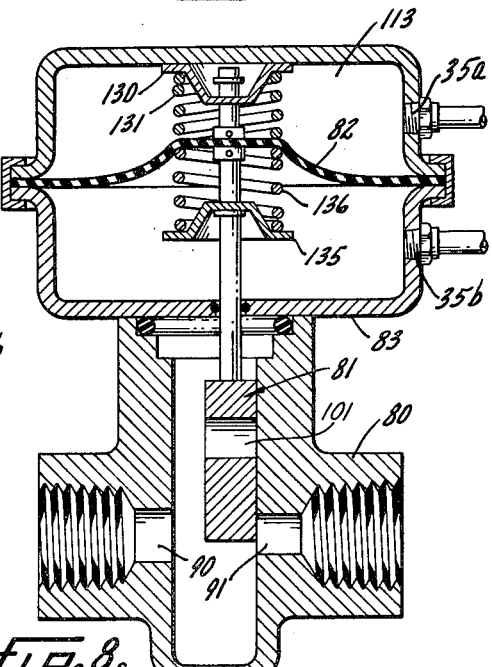
FIGURE 8 is a sectional view similar to FIGURE 7 showing a modified valve relationship when the valve assembly is operating in its cooling capacity.

Recalling that a residual pressure of 2 p.s.i. is present in the service line 35 when the temperature of the room air is at or below 72° F., it should be understood that this residual pressure is now just sufficient to move the diaphragm 82 upwardly to where the cup member 130 seats against the upper shell 110 of the diaphragm housing 83, as seen in FIGURE 7. At this point, the valve slide 81 is in a position in which the outlet port 91 is still completely closed off by the valve slide. Consequently, of course, no cooling fluid is allowed to flow from the source 21 to the heat transfer unit 22. The environmental temperature surrounding the enclosed room is probably higher than 72° F. (since it is summer) and is normally effective to heat the room air up to this optimum temperature and past it.

As has previously been described in relation to the operation of the control system 10 in its heating capacity, however, when the room air temperature rises above 72° F. the pressure within the service line 35 builds up correspondingly in programmed relationship. Accordingly, pressure within the lower chamber 114 of the diaphragm housing 83 also builds up and forces the diaphragm 82 upwardly against the bias of the coil spring 131. This in turn moves the slide valve 81 upwardly and slowly opens the valve outlet port 91 to permit cooling fluid to pass at a predetermined rate from the source 21 of cooling fluid to the heat transfer unit 22. This effects a cooling of the room air until the optimum temperature of 72° F. is reached once more, at which time the valve slide 81 has once more closed off the passage of cooling fluid through the valve housing 80.

As pointed out, however, the temperature control system 10 can readily be utilized as either a heating control system or a cooling control system but not selectively as one or the other. In other words, the service line 35 is semi-permanently connected to either the upper chamber 113 or the lower chamber 114 of the diaphragm housing 83. Consequently, the system 10 is generally used permanently either as a heating control system or as a cooling control system.

On the other hand, the new and improved temperature control system 11 shown in FIGURE 2 is alternatively and selectively utilizable as either a heating control system or a cooling control system. The double acting control system 11 utilizes, with few exceptions, the identical components as the system 10 described above. Consequently, where these components are identical they are identified by the same reference numerals utilized in the description of the single purpose control system 10. Where the components of the system 11 are at variance with those found in the system 10, they are identified by reference numerals which correspond to the reference numerals identifying their counterparts in the latter system, plus 200 digits.

Basically, in the double acting control system 11, a pressure responsive valve assembly 20 regulates the flow of a control fluid from a source 221 of either heating fluid or cooling fluid to a heat transfer unit 22 within an enclosed room (not shown). Regulation of the flow of control fluid is effected as a function of the room air temperature sensed by a temperature sensitive pressure system, seen generally at 123. The control system 11 is alternatively and selectively utilizable in either its heating capacity or in its cooling capacity and, in either case, the system modifies the temperature of the room air as a function of variations in the room air temperature from a predetermined optimum temperature.

The temperature sensitive pressure system 123 includes a source of air pressure 230 which is in direct fluid communication with the atmosphere through a fluid pressure supply line 32 containing a conventional restrictor valve 33, a T-joint 34, a fluid pressure service line 35, and a temperature sensing pressure signal assembly 31. The service line 35 is, in turn, connected in direct fluid communication with the pressure responsive valve assembly 20 through a seasonal selector valve unit, seen generally at 236.

The seasonal selector valve unit 236 is effective to alternatively connect the service line 35 with either the upper chamber 113 or the lower chamber 114 of the diaphragm housing 83 (in the pressure responsive valve assembly 20) as a function of the air pressure at the source 230. In other words, for a predetermined air pressure at the source 230, the selector valve unit 236 causes the service line 35 to come into direct fluid communication with the upper chamber 113 while for another fluid pressure at the source 230, the selector valve unit 236 causes the service line to come into direct fluid communication with the lower chamber 114.

To facilitate this change over, the source 230 of air pressure is capable of delivering air at a pressure of 18 p.s.i. or 22 p.s.i., alternatively, through the supply line 32 and consequently to the seasonal selector valve unit 236. When it is desirable to operate the system 11 in its heating capacity, for example, the air pressure in the supply line 32 is preferably adjusted to 18 p.s.i. by conventional valve means (not shown) whereupon the selector valve unit 236 causes the pressure in the service line 35 (which remains at about 2 p.s.i. because of the restrictor valve 33) to be effective within the upper chamber 113 of the pressure responsive valve assembly 20. When it is desirable that the control system 11 operate in its cooling capacity, the air pressure in the supply line 32 is preferably raised to 22 p.s.i. whereupon the selector valve unit 236 causes the residual pressure of 2 p.s.i. in the service line 35 to be effective in the lower chamber 114 of the valve assembly 20.

At the same time, of course, the source 221 of both heating and cooling fluid is set up so that a heating fluid is provided when the system is operating in its heating capacity and a cooling fluid is provided when the system is operating in its cooling capacity. This change over from heating fluid to cooling fluid is made at the same time that the air pressure in supply line 32 is increased, for example. In this light, the pressures utilized, 18 p.s.i. and 22 p.s.i., for example, are merely exemplary and might be varied considerably.

The seasonal selector valve control unit 236 includes a two-way valve 236a, of well known construction, which is operated by a conventional bellows 236b as a function of the air pressure within the bellows. When the pressure within the supply line 32 is 18 p.s.i., for example, the pressure within the bellows 236b will also be at 18 p.s.i. and this is effective to cause the two-way valve 236a to shunt communication from the service line 35 to the shunt line 236c. Pressure in the service line is consequently effective in the lower chamber 114 of the diaphragm housing 83 and the system 11 operates as a cooling control system.

On the contrary, if the pressure in the service line 32 is 22 p.s.i., for example, the bellows 236b expands and causes the valve 236a to shunt communication with the service line 35 over to the shunt line 236d. As a result, the residual air pressure in the service line 35 is effective in the upper chamber 113 of the diaphragm housing 83 and the system 11 consequently acts as a heating control system.

Referring to FIGURES 5 and 6, with the system 11 operating in its heating capacity, the service line 35 is connected through the shunt line 236d with the upper chamber 113, as at 35a. Pressure in the service line 35 is effective to regulate the flow of heating fluid in precisely the manner described in relation to the operation of the temperature control system 10 functioning in its heating capacity. On the other hand, referring to FIGURES 7 and 8, when the air pressure within the service line 35 is effective in the shunt line 236c and (through the connection seen generally at 35b) consequently the lower chamber 114, the control system 11 operates in its cooling capacity in exactly the manner described in relation to the temperature control system 10 when it is utilized as a cooling control system. Of course, when service line pressure is effective in the upper chamber 113, the lower chamber is vented to the atmosphere back through shunt line 236c and the conventional valve 236a. The upper chamber 113 vents back through shunt line 236d when service line pressure is effective in the lower chamber.

The source 221 of control fluid might be alternatively effective to supply heating fluid from a source 221a or a cooling fluid from a source 221b through a conventional two-way valve 221c, in a well known manner. The change over from heating to cooling fluid is made at the time the system is switched from a heating to a cooling control system, for example, by changing the effective air pressure in the supply line 32 from the source 230 from 22 p.s.i. to 18 p.s.i., as has been pointed out.

The temperature control systems 10 and 11 described above are readily adaptable to effectively regulate the temperature of an enclosed room or of virtually any enclosed fluid medium. Either control system, 10 or 11, can be utilized to provide temperature regulation in a warm or hot environment or where a cooler or cold environment is found.

Whether the temperature control systems are used in a heating or cooling capacity, minute changes in temperature from a predetermined optimum temperature are rapidly and accurately sensed and countered to re-adjust the temperature of the fluid medium to the predetermined optimum temperature. The systems are highly sensitive and can readily be set up to maintain virtually any predetermined optimum temperature with virtually any degree of sensitivity.

In addition, the dual acting temperature control system 11 facilitates rapid change over from use in a heating capacity to use in a cooling capacity. As such, the system 11 is adaptable to utilization under widely varying environmental conditions.

While several embodiments described herein are at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A control valve arrangement for regulating the flow of a heat transfer fluid from a source of the heat transfer fluid into heat transfer relationship with a fluid medium as a function of a predetermined schedule of single pressures related to the temperature of said medium to maintain a predetermined optimum fluid medium temperature comprising; a valve housing, passage means through said housing for said heat transfer fluid, valve means mounted in said passage means for modulating the flow of heat transfer fluid therethrough, diaphragm means connected to said valve means and adapted to respond to the signal pressures to move said valve means in modulation of said flow of heat transfer fluid through said passage, and modulating control means for modulating the movement of said valve means according to a predetermined schedule coordinated with variation in signal pressure, said modulating control means being effective to modulate the movement of said valve means only after movement of said diaphragm means from a neutral position to a predetermined initial operating position.

2. A control valve arrangement for alternatively regulating the flow of a heating or a cooling heat transfer fluid from a source of heat transfer fluid into heat transfer relationship with a fluid medium as a function of a predetermined schedule of signal pressures related to the temperature of said medium to maintain a predetermined optimum fluid medium temperature comprising; a valve housing, passage means through said housing for the heat transfer fluid, valve means mounted in said passage means for modulating the flow of heat transfer fluid therethrough, diaphragm means adapted to respond to the signal pressures, means connecting said diaphragm means to said valve means, said valve means moving in opposite directions for modulating the flow of a heating or a cooling heat transfer fluid through said passage means as a function of the response of said diphragm means to the signal pressures, and modulation control means including a resilient means associated with said connecting means on each side of said diaphragm means to act on said diaphragm means and modulate the movement of said valve means in both of said opposite directions according to a predetermined schedule coordinated with variation in signal pressure.

3. The control valve arrangement of claim 2 further characterized in that said modulation control means includes a retaining member mounted on said connecting means on either side of said diaphragm means one resilient means disposed between said diaphragm means and each of said retaining members, each of said resilient means being of a predetermined strength to modulate the movement of said diaphragm means and consequently said valve means according to a predetermined schedule coordinated with variation in signal pressure.

4. The control valve arrangement of claim 3 further characterized in that each of said resilient means is effective to modulate movement of said diaphragm means only after a predetermined movement of said diaphragm means in a corresponding direction in response to a predetermined initial increase in signal pressure.

5. A control valve arrangement for regulating the flow of a heat transfer fluid from a source of the heat transfer fluid into heat transfer relationship with a fluid medium as a function of a predetermined schedule of signal pressures related to the temperature of said medium to maintain a predetermined optimum fluid medium temperature, comprising; a valve housing, passage means through said housing for said heat transfer fluid, valve means mounted in said passage means for modulating the flow of heat transfer fluid therethrough, diaphragm means adapted to respond to the signal pressures, means connecting said diaphragm means to said valve means, said valve means moving in modulation of said flow of heat transfer fluid through said passage means as a function of the response of said diaphragm means to the signal pressures, and modulation control means, said modulation control means including a retaining member mounted on said connecting means, and resilient means disposed between said diaphragm means and said retaining member and tending to bias them apart, said resilient means being of predetermined strength to modulate the movement of said diaphragm means and consequently said valve means, said resilient means being effective to modulate movement of said diaphragm means only after a predetermined movement thereof in response to a predetermined increase in signal presusre.

6. The control valve arrangement of claim 5 further characterized in that said connecting means comprises a rod member, said retaining member being mounted on said rod member for movement toward said diaphragm means to compress said resilient means and modulate movement of said diaphragm means in response to said variations in signal pressure.

7. The control valve of claim 5 further characterized in that said modulation control means includes another retaining member connected to said diaphragm means on the opposite side of said diaphragm means from said first mentioned retaining member, and another resilient means disposed between said diaphragm means and said other retaining member to bias them apart, said other resilient means also being of predetermined strength to modulate the movement of said diaphragm means and consequently said valve means according to a predetermined schedule coordinated with variation in signal pressure.

8. A system for controlling the temperature of a fluid medium by regulating the flow of both cooling and heating heat transfer fluid from source means thereof into heat transfer relationship with the medium, comprising; a source of signal fluid under pressure, the source pressure being adjustable between at least a first pressure and a second pressure, service line means connecting said source with signal fluid escape means, pressure reducer means in said service line means for establishing a predetermined normal pressure in the service line means downstream of said pressure reducer means regardless of whether the pressure at said source is said first or second pressure, said escape means permitting the escape of said signal fluid from said service line means at a predetermined rate which is a function of the temperature within the medium to develop a characteristic residual signal pressure in said service line means downstream of said pressure reducer means, control valve means operable in one direction to regulate the flow of cooling heat transfer fluid to said medium and in the opposite direction to regulate the flow of heating heat transfer fluid to said medium, supply line means connecting said control valve means to said service line means downstream of said pressure reducer means for actuation of said control valve means by pressure of said signal fluid in either said one direction or said opposite direction, and selector valve means associated with said supply line means for directing signal fluid under pressure to operate said control valve means in said one direction or said opposite direction, said selector valve means being connected to said source of fluid pressure and responsive thereto so as to direct said signal fluid to operate said control valve means in said one direction when said source fluid is under said first pressure and in said opposite direction when said source fluid is under said second pressure.

References Cited by the Examiner

UNITED STATES PATENTS

| | | | |
|---|---|---|---|
| 616,141 | 12/98 | Roesch | 236—87 |
| 2,125,889 | 8/38 | Crump | 236—1 |
| 2,135,294 | 11/38 | Snediker | 236—1 |
| 2,207,941 | 7/40 | Otto | 236—82 |
| 2,270,037 | 1/42 | Corbin | 251—61 |
| 2,272,025 | 2/42 | Scharpf | 236—1 |
| 2,307,229 | 1/43 | Moore | 236—82 |
| 2,312,671 | 3/43 | Otto | 236—87 |
| 2,331,799 | 10/43 | Pett | 236—82 |
| 2,511,340 | 10/50 | Joesting | 236—1 |
| 2,615,468 | 10/52 | Woolley | 251—61 |
| 2,839,248 | 6/58 | Edwards | 236—87 |
| 2,879,971 | 3/59 | Demay | 251—61 |
| 3,019,985 | 2/62 | Grosjean | 236—80 |
| 3,047,233 | 7/62 | Scharpf | 236—1 |

EDWARD J. MICHAEL, *Primary Examiner*.

ALDEN D. STEWART, *Examiner*.